United States Patent [19]
Gonsalves

[11] 3,849,927
[45] Nov. 26, 1974

[54] DEVICE AND METHOD FOR PREVENTING ENTRAPMENT OF SEA MAMMALS

[76] Inventor: John T. Gonsalves, 600 Anita St., Space No. 39, Chula Vista, Calif. 92011

[22] Filed: Aug. 27, 1973

[21] Appl. No.: 391,744

[52] U.S. Cl.......................... 43/14, 43/17.1, 43/106
[51] Int. Cl............................................ A01k 73/12
[58] Field of Search .................. 43/14, 7, 17.1, 106

[56] References Cited
UNITED STATES PATENTS

| | | | |
|---|---|---|---|
| 379,751 | 3/1888 | Winsor | 43/14 |
| 721,517 | 2/1903 | Harris | 43/14 |
| 972,233 | 10/1910 | Pike | 43/106 |
| 972,235 | 10/1910 | Pike | 43/106 |
| 3,494,064 | 2/1970 | Stein | 43/17.1 |
| 3,638,346 | 2/1972 | Stein | 43/17.1 |

Primary Examiner—Louis G. Mancene
Assistant Examiner—Daniel J. Leach
Attorney, Agent, or Firm—Brown and Martin

[57] ABSTRACT

A device for providing an escape route or routes for sea mammals, such as porpoises, from the seine webbing as the webbing is being raised for collecting other species of fish. The escape route includes material which is impervious to the nose of said mammals, the material, in the form of a panel, being disposed on the inner side of the seine and the upper edge thereof being substantially at water level and covering the seine floats.

7 Claims, 5 Drawing Figures

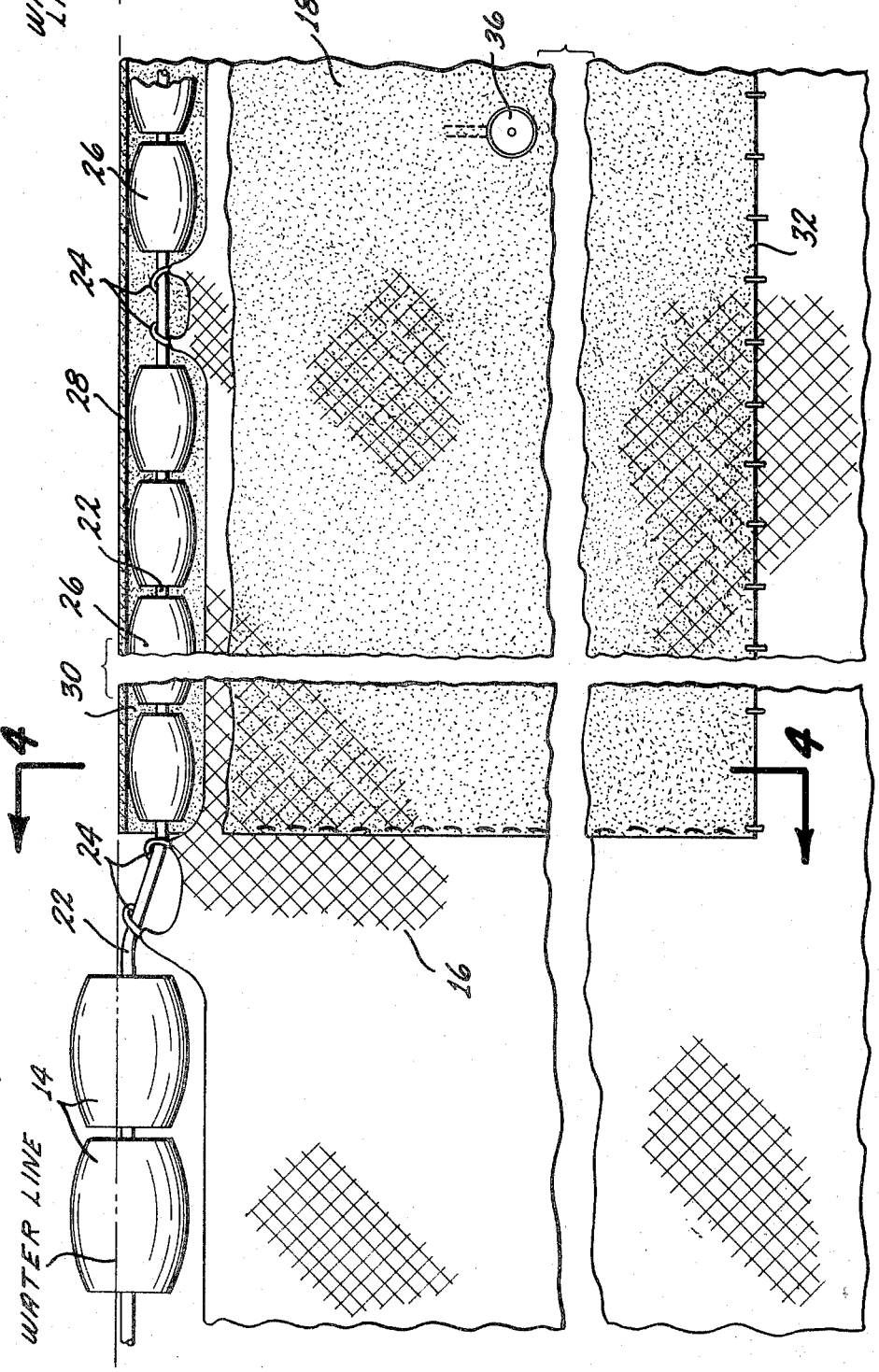

DEVICE AND METHOD FOR PREVENTING ENTRAPMENT OF SEA MAMMALS

BACKGROUND OF THE INVENTION

1. Field of the Invention

The field is the art of purse seining.

2. Description of the Prior Art

The present day method of purse seining for fish of the tuna family, such as yellowfin and skipjacks, comprises what is known in the trade as the "Backing-Down Method" in the endeavor to permit the porpoises to escape the seine. This is done by rolling in over half of the seine, then tying it down, then manipulating the boat until the webbing of the seine is stretched to its full length, thereby spilling the porpoises out of the bend of the webbing. However, many of the porpoises become entangled in the webbing before the backing-down phase. Others become entrapped in the bends, and still others are seriously hurt by being rolled over the corks and corklines.

SUMMARY OF THE INVENTION

Tests made by the Bureau of Commercial Fisheries disclosed that porpoises have morbid fear of the webbing, the corkline and the cords on purse seines.

In practicing the present invention, an escape route is or escape routes are provided which materially alleviate the porpoises' fear of the corkline and corks. The seine carries a panel or panels of material on the inner side thereof. The tops of the panels cover the corks and the line between the corks. The corks that are covered by the panels are of relatively smaller vertical width when compared with the corks on the remaining parts of the seine. Furthermore, the corks are placed sufficiently close to one another so that the top of the panels appear as a substantially horizontal line at the level of the water.

Various means can be adopted to call to the attention of the porpoises the area of the escape route. For example, a sound generator, which generates sound of a frequency audible by porpoises, is placed adjacent the panel.

Other features and the advantages of the present invention will be apparent from the following description, references being made to the accompanying drawings wherein a preferred embodiment of the invention is illustrated.

BRIEF DESCRIPTION OF THE DRAWINGS

FIG. 3 is a fragmentary view similar to FIG. 2, but showing a fragment of an inside portion of the panel removed, the view being on a larger scale than FIG. 2;

FIG. 4 is a sectional view taken along line 4—4 of FIG. 3, and

DESCRIPTION OF THE PREFERRED EMBODIMENT

Figure 1:
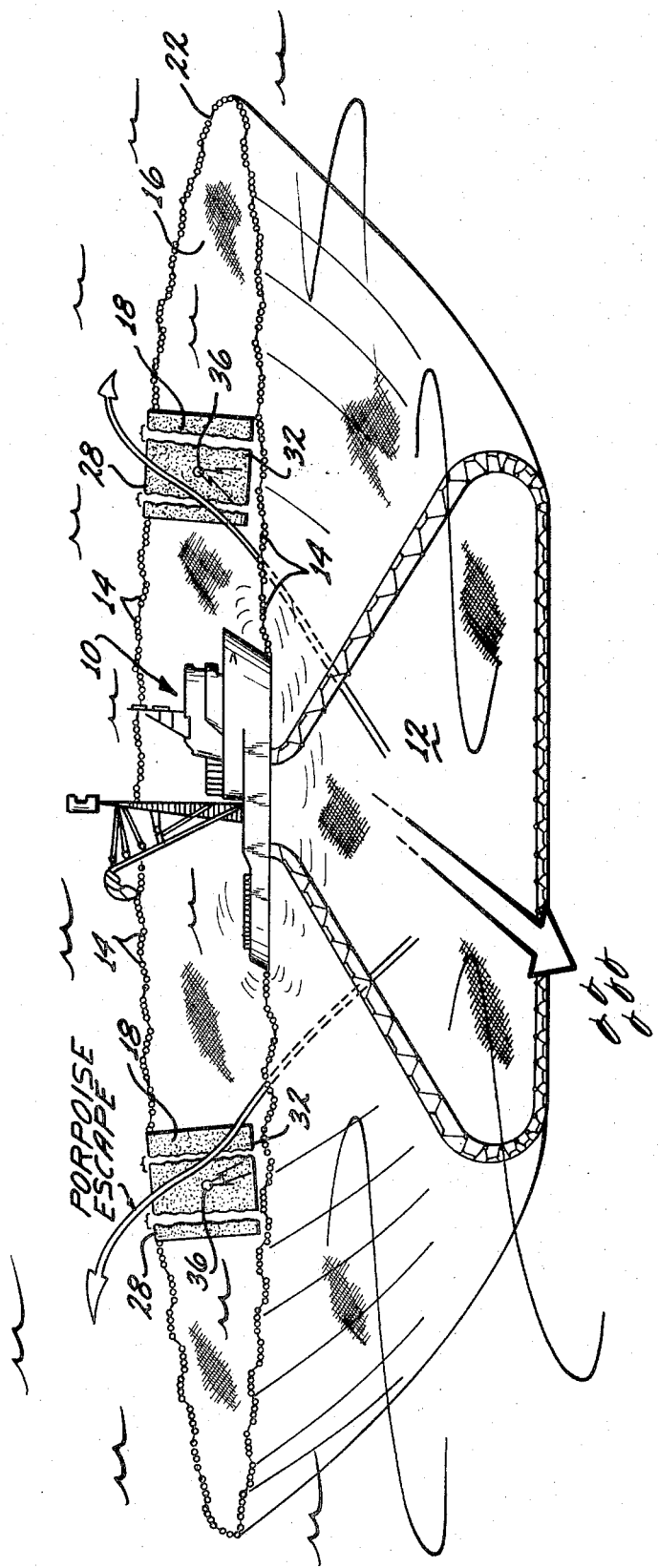
FIG. 1 is a perspective view of a tuna boat, the water in which it is afloat, a purse seine which is partly closed and panels of the present invention attached to the seine.
Figure 2:
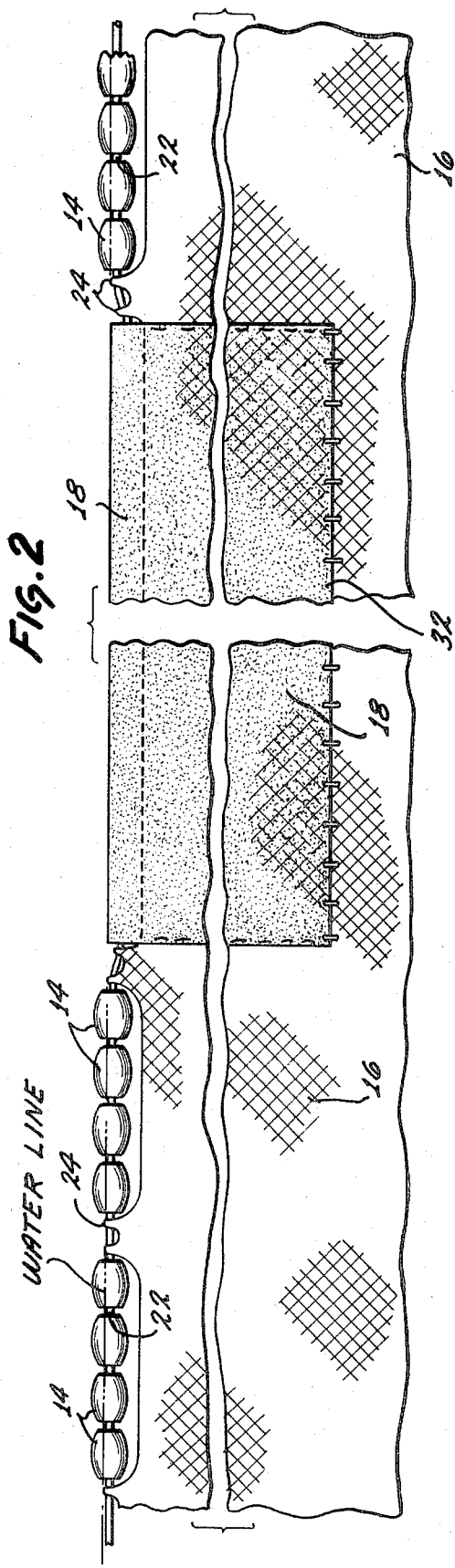
FIG. 2 is a fragmentary view of the upper section of a seine showing panels of the present invention in position.
Figure 5:
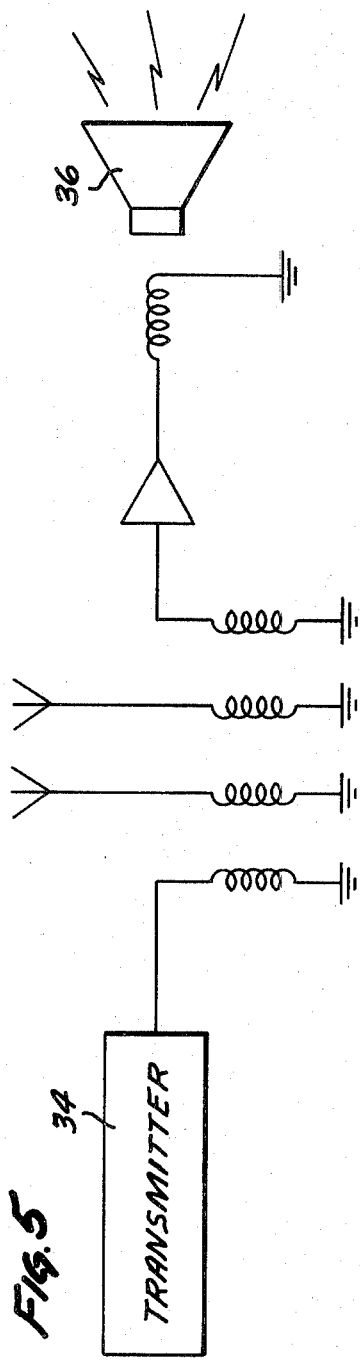
FIG. 5 is a schematic view of a signal system.

Referring to FIG. 1, a tuna boat 10 is shown that has almost completed its circle and showing the seine 12 prior to pursing the same. This view also shows a series of floats 14 at the top of the seine and an exterior view of part of the webbing 16 that is suitably attached to the float for supporting the webbing. FIG. 1 also shows two panels 18. The panels are preferably approximately 60 feet in horizontal length and 6 feet in vertical width.

Referring to FIGS. 2, 3, 4 and 5, the floats 14, other than those that are hereinafter described, are standard size through which is strung the main corkline 22. Hanging fasteners 24 are fixed to the corkline and floats to which the top of the webbing 16 is attached. The usual purse rings are attached to the bottom of the web.

One or more panels 18 are fixed to the webbing 16. Each panel is supported by a series of floats 26 that are smaller in diameter than the standard floats 14, as seen more clearly in FIG. 3. The floats 26 also receive the corkline 22 to which hanging fasteners 24 for webbing are attached.

Substantially the entire panel 18 is disposed on the inner side of the webbing 16. As seen more clearly in FIG. 4, the upper portion 28 of the panel 18 overlies the smaller floats 26 and the back side 30 of the panel is fixed to the webbing. The lower end 32 of the panel 18 is also fixed to the webbing.

The panel 18 is sufficiently opaque so that the webbing 16 in the rear thereof cannot be seen. The smaller floats 26 are strung sufficiently close linearly so that there is no sagging of the top portion 28 of the panel whereby the top of the panel appears as a substantially straight horizontal line.

The size of the floats 26 are computed with respect to other parts of the seine and the panel so that the top of the panel is at or below the top surface of the water. Thus, no floats and no corkline appear above the panel 18. Thus, the area above the panel appears to be an escape route from the interior of the seine, and which, in fact, provides a route in which the mammals can readily swim over the top of the panel.

As is well known, a frequency has been established which can be heard by porpoises. To further enhance the escape route, a frequency transmitter can be utilized, such as that shown in FIG. 5. The transmitter 34 is stationed on the boat 10 and the loud speaker 36 carrying the porpoise-responsive frequency is stationed near the panel 18.

Having described my invention, I claim:

1. The step in the method of preventing entrapment of sea mammals while purse seining for other species of fish, the seine being of the type having floats at the top of the webbing, which step comprises disposing a material, of the type having the characteristic of preventing entanglement thereof with the nose of the seal mammal, onto the inner side of the webbing of the seine with the upper edge supported by the floats at substantially water level.

2. The steps as defined in claim 1, characterized in that the material overlies the floats throughout substantially the horizontal length of the material.

3. The steps in the method as defined in claim 1, characterized to include the step of transmitting, adjacent the material, sound at a frequency heard by the mammal.

4. The steps in the method as defined in claim 2, characterized to include the step of transmitting, adjacent the material, sound at a frequency heard by the mammal.

5. A combination including a purse seine having floats at the top thereof; and an upper section of material, which is impervious to the nose of mammals, secured along the inside of the seine.

6. A combination comprising:
   A. a purse seine having floats at the top thereof;
   B. a strip of material, which is impervious to the nose of a water mammal, disposed on the inner side of the seine with the top of the material at substantially water level;
   C. means for securing the strip of material to the seine.

7. A combination as defined in claim 6, characterized in that the floats at the strip of material are disposed to maintain the top of the material at substantially water level.

* * * * *